United States Patent Office 3,223,605
Patented Dec. 14, 1965

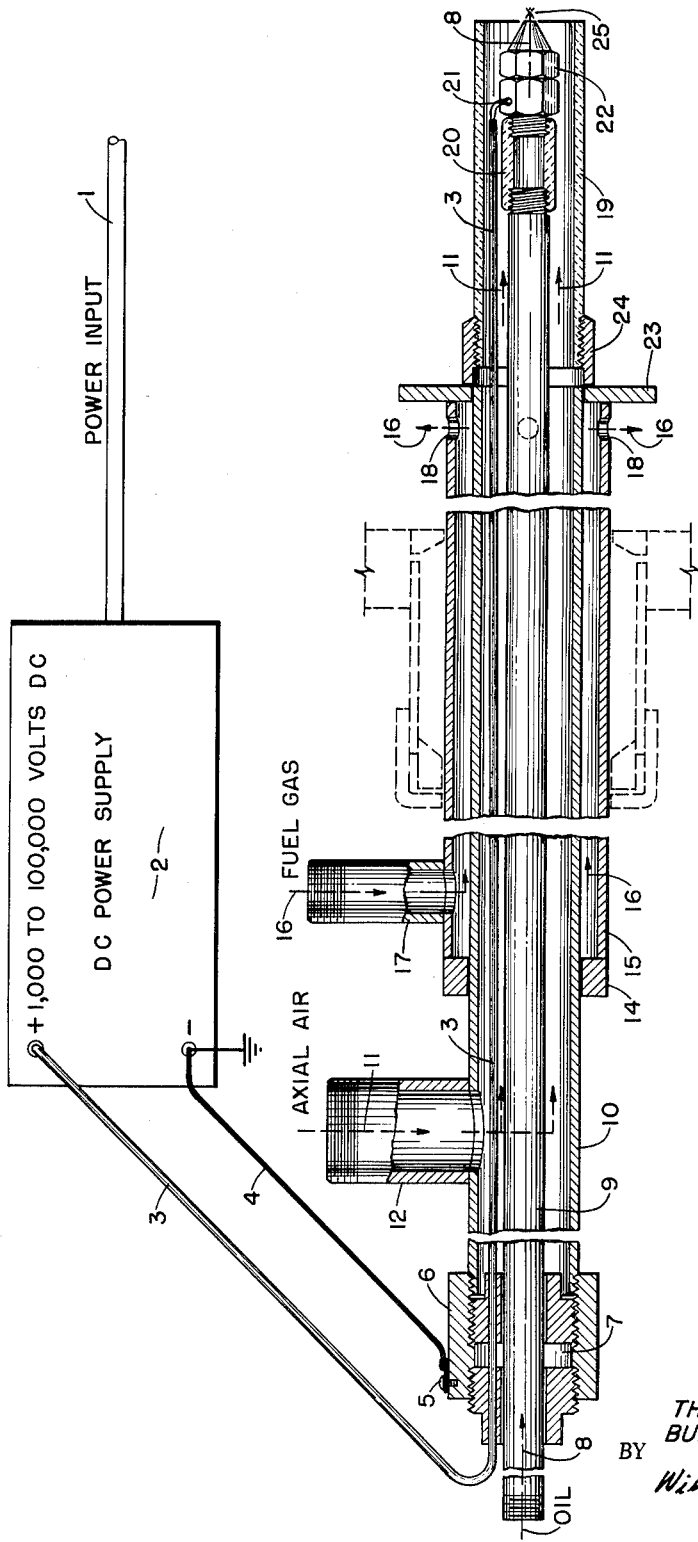

3,223,605
MANUFACTURE OF CARBON BLACK
Theodore A. Ruble and Burton F. Latham, Jr., Houston, Tex., assignors to Continental Carbon Company, Houston, Tex., a corporation of Delaware
Filed Aug. 27, 1962, Ser. No. 219,589
8 Claims. (Cl. 204—173)

This invention relates to an improved process for manufacturing oil furnace carbon blacks. More particularly, the present invention pertains to the furnace method for producing rubber reinforcing grades of carbon black from an atomized or vaporized, normally liquid hydrocarbon feedstock wherein certain properties of the black thus produced are beneficially controlled by imparting an electrical charge to said feedstock immediately prior to the dissociation thereof.

The oil furnace process to which this invention has unique applicability basically consists of burning a normally liquid hydrocarbon in a refractory-lined reactor or furnace with a deficiency of air. In actual practice, however, pyrolysis conditions are continuously maintained in the furnace by burning therein a substantially stoichiometric mixture of fuel gas and air. Thus, the feedstock introduced into the reactor is almost quantitatively converted into carbon black. By such a process, a number of grades of rubber reinforcing blacks can be made ranging from the largest particle-size material referred to as general purpose black (GPF) to a very fine particle-size material classified as super abrasion-resistant carbon black (SAF). These blacks are extensively used for compounding with rubber in the preparation of automobile tires. This is especially true of the finer particle-size blacks prepared by the aforesaid process which are exclusively used in the tread portion of the tire. The various grades of rubber reinforcing carbon black mentioned are obtained by observing certain processing conditions within the basic process. While feedstock preheat temperature, variation of reaction temperature (within an effective pyrolysis range) and the like minorly affect the grade of black that will result, the principal variable which determines the grade of the black produced fundamentally resides in the type or extent of turbulent conditions observed within the reactor.

Irrespective of the conditions selected for use in an oil furnace process yielding a given type of carbon black, certain variations of product quality as opposed to grade will nevertheless be experienced. Accordingly, it is the principal objective of this invention to provide a simple method for controlling such inevitable variations, which in turn will provide a carbon black manufacturer an effective method for maintaining quality control.

There are two important quality standards which manufacturers strive to maintain for any given grade of rubber reinforcing carbon black. One of these quality standards concerns the structure of the black. Structure is essentially the inherent tendency for the individual carbon black particles to agglomerate to form chain-like units of the particles during and immediately subsequent to the completion of the pyrolysis reaction. The property of structure is very important insofar as structure is directly related to certain critical properties exhibited by the cured compounded rubber composition. It is obviously impossible for a carbon black producer to continuously examine the product's structure characteristics by testing the black in a rubber composition. Therefore, a simple test has been devised, commonly referred to as the oil absorption test, which permits a satisfactory appraisal of the structure characteristics of the black. Accordingly, a specific object of this present invention is to provide a method for regulating the oil absorption characteristics of an oil furnace black and particularly, a method for lowering the structure of the carbon black during the course of its formation.

Another quality control standard recognized in this art is related to the surface area exhibited by the carbon black usually expressed in terms of square meters per gram. Therefore, another advantage residing in the practice of the present invention is that it provides a method for regulating and, more specifically, increasing the surface area of the resultant carbon black.

A still further object of our invention is to facilitate the atomization of the carbon producing feedstocks which do not lend themselves to vapor injection techniques.

These and other objectives and advantages of this invention will more clearly be understood by those skilled in the art upon consideration of the detailed discussion set forth hereinbelow.

The aforementioned quality variations usually experienced in producing any given type of carbon black are principally contributed to by the nature of the feedstock employed. The problem of maintaining quality control is especially complicated by the fact that numerous types of carbonaceous feedstocks, each differing in chemical composition, are used to produce carbon black. While most any kind of normally liquid hydrocarbon can be used satisfactorily in the oil furnace process, actually only a certain type of feedstock is used domestically on a commercial scale. This feedstock is generally a residual oil or tar having a very high aromatic content obtained as the residue in either the thermal or catalytic cracking of petroleum distillates. These oils or tars are complex in chemical composition and vary in such composition depending upon the crude stock from which they are ultimately derived or upon the particular cracking process to which the stock is subjected. Consequently, it can be seen that quality control of carbon black production is a difficult problem even when a plant is operating exclusively with a given type of feedstock, say a residual oil.

In accordance with this invention, the carbon producing feedstock, specifically a normally liquid hydrocarbon, is introduced into a furnace while imparting an electrical charge to the feedstock immediately prior to the introduction thereof into the pyrolysis zone. It is contemplated that an electrical charge be imparted to the injected feedstock whether same is introduced into the reaction zone in a vaporized state or in a finely divided form, i.e., an atomized spray. When spraying is employed as the injection means, it has been noted that the feedstock can be suitably charged by maintaining the spray nozzle at an elevated, either positive or negative, electrical potential. In using a vaporizable feedstock, it is common practice to introduce the make in vaporous form into the furnace through an injection means consisting simply of an open-end pipe. In the observance of such an injection technique herein, it is necessary that a plurality of metallic screens or grids be mounted within the pipe near the outlet extremity thereof and that these metallic obstructions be maintained along with the enclosing portion of the pipe at an elevated electrical potential in order to charge the vaporous feedstock effectively.

It appears that in the practice of our invention, an electrical charge is imparted to either the individual oil droplets or the gas in the case of vaporizable materials and that the charge associated with the feedstock thereupon entering the cracking zone is by and large transferred to individual particles of carbon black as they are formed. We further believe that these individual carbon particles carrying like charges repel one another thereby reducing their chance of collision and thus chain growth or structure development is effectively minimized during a critical phase of the dissociation reaction. The extent to which the structure of the carbon black will be reduced depends upon the extent to which the feedstock droplets or gases are charged. This extent of charging is in turn dependent upon the voltage at which the spray nozzle or injection tube is maintained.

A suitable manner for implementing the process of this invention can be conveniently explained with reference to a conventional spray nozzle injection system adapted for use in any number of prior art furnaces designed to produce rubber reinforcing grades of oil carbon blacks.

Such a feedstock injection system is depicted in the accompanying drawing. The injection assembly shown therein is basically similar to the one used in the carbon black reactor disclosed and claimed in our U.S. Patent No. 2,976,128. This particular reactor, however, is primarily limited to the production of the abrasion-resistant type blacks. Where it is desired to produce any one of the other various grades of reinforcing blacks contemplated herein, reactors such as described in the Latham U.S. Patent No. 2,976,127 and the Ruble U.S. Patent No. 3,009,787 can be used. It will also be apparent to those skilled in the art how the injection assembly shown in the accompanying drawing can be modified for use in these and other types of carbon black reactors.

Referring now to the accompanying drawing, a composite fuel gas burner and hydrocarbon injection assembly is depicted therein as comprising a tube 15 extending through the upstream extremity wall of the reactor selected and axially and rigidly attached thereto by means of a packing gland shown schematically by the dotted line portion of the drawing. Tube 10 is concentrically positioned within the tube 15 and the end of the former disposed within the reactor extends beyond the corresponding or forward end of tube 15. The forward extremity end of tube 10 is threaded for the purpose to be explained hereinafter. A vertically disposed centrally apertured disc 23 is welded to to the forward extremity of tube 15 and in turn to tube 10 thereby serving as a closure member for the forward extension of the annular spacing formed between tubes 10 and 15. The disc 23 has a diameter substantially greater than the outside diameter of tube 18 and, as was inferred previously, has a center aperture corresponding to that of the outside diameter of tube 10. The tube 15 encompasses tube 10 for a short distance rearwardly of the packing gland and the annular spacing between said tubes is sealed by closure plate 14. A fuel gas inlet is provided in tube 15 near said closure plate 14. A plurality of evenly spaced, radically oriented apertures 18 are provided through pipe 15, said apertures communicating with the annular spacing formed between said pipe and tube 10 immediately adjacent to disc 23. Usually, four of such apertures of about ⅜-inch diameter equally spaced about tube 15 serve as a suitable burner arrangement. The purpose of the disc 23 is to prevent blowout of the flame of fuel gas particularly when extreme turbulent conditions are observed within the reactor. Under certain operating conditions, however, a flame holder disc need not be used.

Concentrically mounted by means of spacers (not shown) within tube 10 is a liquid hydrogen (feedstock) supply pipe 9 which terminates forwardly of the flame holder disc 23. Said end of tube 9 is appropriately threaded in order to accommodate an electrically insulating coupling 20 adapted to connect the fuel supply pipe to either a spray nozzle 22 as shown in the drawing or a section of open end metallic pipe containing a plurality of screens or grids in the interior thereof. Rearwardly of the closure plate 14, tube 10 is provided with an inlet connection 12 through which is introduced axial air into the annular chamber formed between the outer surface or the hydrocarbon supply pipe 9 and the inner surface of said tube 10. Supply pipe 9 extends rearwardly through the packing gland 7-coupler 6 arrangement to connect with a source of the feedstock. The axial air 11 flowing in the annular spacing about the hydrocarbon supply tube 9 forms a concentrated stream on the oil spray 25 emanating from the spray head 8 and thereby aids in directing the spray down the center of the furnace and additionally serves to cool the spray nozzle thus obviating coke formation thereon.

A manner of suitably maintaining the spray nozzle 22 at an elevated potential will be described next. As referred to previously, spray nozzle 22 is connected to the hydrocarbon supply pipe 9 by means of the electrically insulating coupling 20. This coupling can be fabricated from any type refractory material capable of being machined. A very suitable refractory of this type is boron nitride. Where it is desirable to have the feedstock spray pattern commence at a point removed forwardly of the burner assembly, such as shown in the accompanying drawing, it becomes necessary to shroud this portion of the nozzle and exposed hydrocarbon supply pipe with a tubular member which essentially consists of an extension of the pipe 10. As mentioned hereinabove, the forward end of pipe 10 is threaded in order to accommodate such an extension. This extension is shown at 19 in the drawing and consists of a tubular member of substantially the same diameter as tube 10 made from an electrical insulating refractory such as boron nitride. Tube 19 is attached to the flame holder 23 by means of stainless steel coupling 24. The insulating extension 19 is necessary in order to prevent arc-over from nozzle 22.

A D.C. power supply 2 such as a transformer rectifier unit operating with A.C. power input 1 or a vibrator switch transformer unit operating with D.C. power input 1 connects with the spray nozzle 22 at the terminal screw 21 by means of an insulated wire 3 which passes through packing gland 6 and the annular spacing form between the hydrocarbon supply pipe 9 and tubes 10 and 19. Ground lead 4 (uninsulated wire) is used to attach the grounded side of the power supply to the grounding screw 5 thereby grounding the burner-injector assembly with the reactor shell thus completing the circuit. Alternate to the arrangement of grounding the reactor shell as described, a plurality of grounded electrodes (oppositely charged from that of the feedstock injection means) can be advantageously mounted in the refractory wall of the reactor. Such oppositely charged electrodes electrostatically cause the charged oil droplets and carbon particles residing in the critical portion of the dissociation zone to disperse rapidly thereby minimizing collision. These grounded electrodes can be made of refractory material such as silica carbide, graphite, etc. In those instances where a castable refractory lining is employed, the entire refractory wall of the reactor or any part thereof can be used as the grounded electrode by mixing suitable amounts of graphite, acetylene black or other heat-resistant, electrically conducting material with the refractory.

As indicated in the drawing, the power supply source can range from 1,000 to 100,000 volts D.C. Generally, however, it is preferred to employ a power source capable of maintaining the spray nozzle at a potential of between about 10,000 and 30,000 volts D.C. For positive energization of the oil spray as shown in the accompanying drawing, electrons are removed from the feedstock 25 sprayed from the positively charged oil spray nozzle 22 which thereupon successively pass through high voltage D.C. lead 4, power supply 2 and ground. The charged oil drops are then dissociated in the reactor and the formed carbon particles which still retain a charge finally lose same by picking up electrons from the surrounding equipment which they pass thereby completing the circuit to ground.

While the drawing shows the spray nozzle as being positively charged, it is to be understood that this polarity can be reversed and thus the spray nozzle can be maintained at any negative potential over the range indicated. The electron flow for such a variation would be reverse to that described directly hereinabove for the connection shown in the drawing. The effect of polarity does not appear to be uniform as addition of electrons to the feedstock mainly facilitates structure reduction whereas the reverse procedure principally affects, i.e., increases, the surface area characteristics of the carbon black formed.

While certain specific embodiments of the present invention have been shown and described herein, it is to be understood that any enumeration of details set forth was primarily for purposes of illustration and accordingly, should not be interpreted as a limitation on the invention except as indicated in the appended claims.

We claim:

1. In a process for the manufacture of carbon black wherein a normally liquid hydrocarbon feedstock is introduced into a reaction zone in which pyrolysis conditions are continuously maintained; the improvement which comprises imparting an electrical charge to said feedstock immediately prior to the introduction thereof into said reaction zone.

2. In a process for the manufacture of carbon black wherein a normally liquid hydrocarbon feedstock is injected into a reaction zone in which pyrolysis conditions are continuously maintained; the improvement which comprises injecting said feedstock in an atomized form into the reaction zone from a spray nozzle which alone is maintained at a potential of from about 1,000 to 100,000 volts.

3. In a process for the manufacture of carbon black wherein a vaporizable normally liquid hydrocarbon feedstock is introduced into a reaction zone in which pyrolysis conditions are continuously maintained; the improvement which comprises introducing said feedstock in a vaporous form into the reaction zone from a hollow metallic member containing a plurality of metallic screens, said assembly of a hollow member and screens being alone maintained at a potential of from about 1,000 to 100,000 volts.

4. A process for producing carbon black which comprises: continuously establishing within a generally cylindrical reaction zone a vortex of a turbulent, combusting mixture of a gaseous fuel and air capable of maintaining a temperature in excess of about 2000° F. in said zone; axially injecting into said vortex a normally liquid carbon black producing feedstock while imparting an electrical charge thereto, cooling the effluent from the reaction zone; and recovering the carbon content of said effluent.

5. A process for producing carbon black which comprises: continuously establishing within a generally cylindrical reaction zone a vortex of a turbulent, combusting mixture of a gaseous fuel and air capable of maintaining a temperature in excess of about 2000° F. in said zone; axially injecting into said vortex a normally liquid carbon black producing feedstock in an atomized form from a spray nozzle which alone is maintained at a potential of from about 1,000 to 100,000 volts.

6. A process in accordance with claim 5 wherein said normally liquid carbon black producing feedstock is a residual oil.

7. A process for producing carbon black which comprises: continuously establishing within a generally cylindrical reaction zone a vortex of a turbulent, combusting mixture of a gaseous fuel and air capable of maintaining a temperature in excess of about 2000° F. in said zone; axially spraying into said vortex a normally liquid carbon black producing feedstock from a spray nozzle which alone is maintained at a potential of from about 10,000 to 30,000 volts.

8. A process in accordance with claim 7 wherein said normally liquid carbon black producing feedstock is a residual oil.

References Cited by the Examiner
UNITED STATES PATENTS

| | | | |
|---|---|---|---|
| 2,357,857 | 9/1944 | Grotenhuis | 204—173 |
| 3,009,783 | 11/1961 | Sheer et al. | 204—173 |

JOHN H. MACK, *Primary Examiner.*